(12) United States Patent
Falzon et al.

(10) Patent No.: US 7,839,567 B2
(45) Date of Patent: Nov. 23, 2010

(54) DEPLOYABLE REFLECTOR IN THE FORM OF A REULEAUX TRIANGLE FOR A SPACE OBSERVATION INSTRUMENT

(75) Inventors: Frederic Falzon, Pegomas (FR); Philippe Blanc, Vence (FR)

(73) Assignee: Thales (FR)

( * ) Notice: Subject to any disclaimer, the term of this patent is extended or adjusted under 35 U.S.C. 154(b) by 56 days.

(21) Appl. No.: 12/065,858

(22) PCT Filed: Sep. 5, 2006

(86) PCT No.: PCT/FR2006/050842
§ 371 (c)(1),
(2), (4) Date: Mar. 27, 2009

(87) PCT Pub. No.: WO2007/028923
PCT Pub. Date: Mar. 15, 2007

(65) Prior Publication Data
US 2009/0180204 A1 Jul. 16, 2009

(30) Foreign Application Priority Data
Sep. 5, 2005 (FR) .................................. 05 52668

(51) Int. Cl.
*H01Q 15/20* (2006.01)
*G02B 23/20* (2006.01)
(52) U.S. Cl. .................... 359/399; 343/915; 359/855
(58) Field of Classification Search .............. 343/915; 359/364–366, 399, 850, 854–859, 871, 872, 359/877
See application file for complete search history.

(56) References Cited

U.S. PATENT DOCUMENTS

| | | | | |
|---|---|---|---|---|
| 3,397,399 A * | 8/1968 | Carmen | ...................... | 343/915 |
| 3,574,447 A | 4/1971 | Ruble | | |
| 3,699,576 A * | 10/1972 | Hoyer | ........................ | 342/10 |
| 3,717,879 A * | 2/1973 | Ganssle | ...................... | 343/915 |
| 4,315,265 A * | 2/1982 | Palmer et al. | ................ | 343/840 |
| 4,529,277 A * | 7/1985 | Gee et al. | ..................... | 359/854 |
| 5,898,529 A * | 4/1999 | Meyer et al. | ................ | 359/853 |
| 6,226,121 B1 * | 5/2001 | Atkinson et al. | ............. | 359/399 |
| 6,972,901 B2 * | 12/2005 | Hachkowski et al. | ........ | 359/399 |
| 7,098,867 B1 * | 8/2006 | Gullapalli | .................... | 343/915 |
| 7,216,995 B2 * | 5/2007 | Harada et al. | ............... | 359/871 |
| 7,595,769 B2 * | 9/2009 | Bassily | ...................... | 343/915 |
| 7,755,564 B2 * | 7/2010 | Gonzalez et al. | ............ | 343/915 |

OTHER PUBLICATIONS

Proc SPIE Int Soc Opt Eng; Proceedings of SPIE—The International Society for Optical Engineeing 1994 Publ by Society of Photo-Optical Instrumentation Engineers, Bellingham, WA, USA, vol. 2200, 1994, pp. 335-346, XP002414559.

* cited by examiner

*Primary Examiner*—Mark Consilvio
(74) *Attorney, Agent, or Firm*—Lowe Hauptman Ham & Berner, LLP

(57) ABSTRACT

A deployable reflector (RP), for a space observation instrument is disclosed. The deployable reflector has a chosen number of deployable reflecting elements (E1a-E3b) suitable, once deployed in a first position, for together defining a reflecting area in the form of a so-called Reuleaux triangle (RD) with closed convex curve whose width is constant as a function of direction.

10 Claims, 3 Drawing Sheets

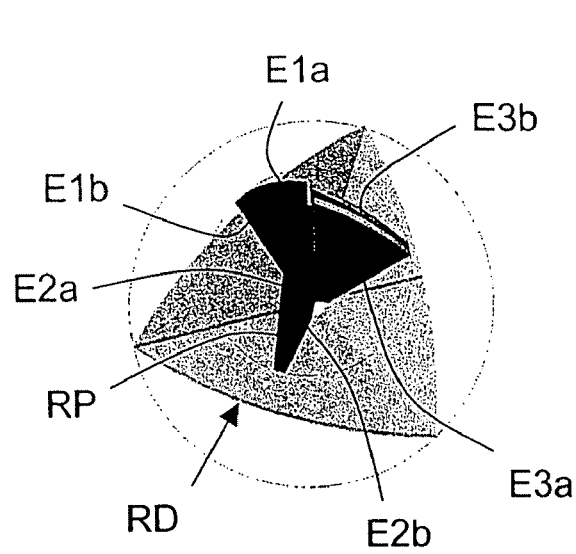
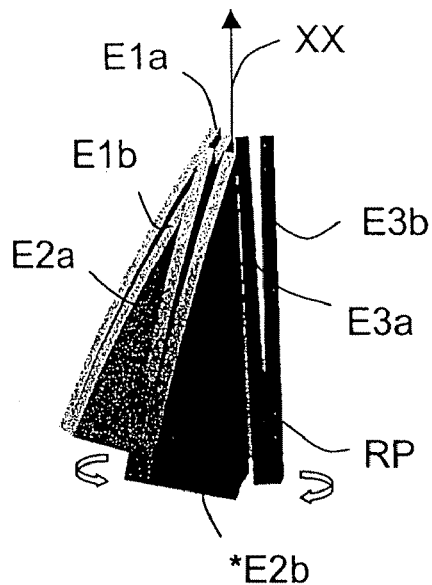
FIG.4A             FIG.4B
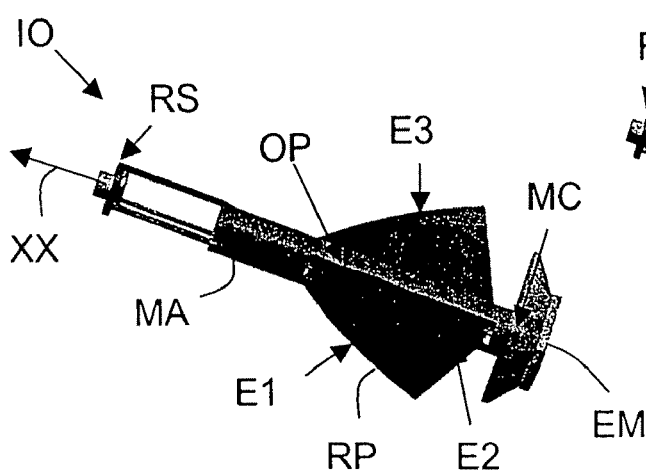
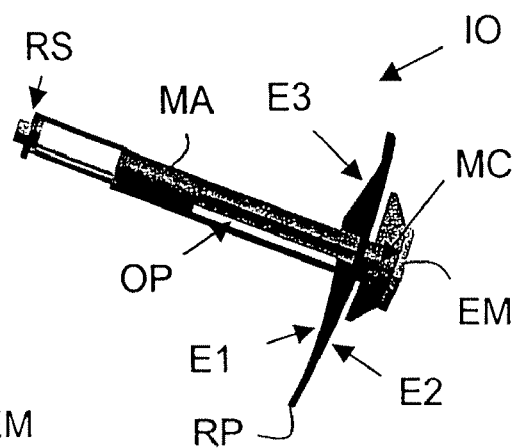
FIG.5A             FIG.5B

DEPLOYABLE REFLECTOR IN THE FORM OF A REULEAUX TRIANGLE FOR A SPACE OBSERVATION INSTRUMENT

CROSS-REFERENCE TO RELATED APPLICATIONS

The present Application is based on International Application No. PCT/FR2006/050842, filed on Sep. 5, 2006, which in turn corresponds to French Application No. 0552668 filed on Sep. 5, 2005, and priority is hereby claimed under 35 USC §119 based on these applications. Each of these applications are hereby incorporated by reference in their entirety into the present application.

FIELD OF THE INVENTION

The invention relates to observation instruments carried onboard spacecraft, such as for example observation satellites, and more precisely observation instruments comprising a reflector intended to be deployed (or unfolded) once the spacecraft which supports them has reached a chosen position.

BACKGROUND OF THE INVENTION

As known by the person skilled in the art, certain space observation missions require observation instruments furnished with a reflector (generally of so-called primary type) of large diameter. Such is notably the case for missions intended to observe the Earth or the sky with a high resolution from high geostationary orbits ("GEO"), Molnya or L2, for example. The future JWST ("James Webb Space Telescope") telescope is one example. It actually uses a primary mirror about 6 meters in diameter.

The spacecraft that support such observation instruments are placed in orbit by means of rockets, the diameter of whose shroud fixes the diameter of the instrument. If the diameter of the instrument once in orbit exceeds that of the shroud, its primary reflector must be compacted (or folded back) by means of an appropriate mechanism during the firing phase (or launch phase), then decompacted (or deployed, or else unfolded) once in orbit by virtue of the mechanism and a decompacting strategy. These compacting/decompacting strategies are formulated under several constraints, such as for example mechanical constraints (related to the mechanisms), thermoelastic constraints and image-quality constraints. These constraints being well known, the number of solutions that can be implemented is relatively limited.

A solution, used notably for the JWST telescope, consists in using a primary mirror furnished with a central part and with at least two lateral parts folded back during firing. The central part and lateral parts consist for example of reflecting tiles of hexagonal shape which, once decompacted (or deployed), constitute a hexagonal tiling approximating a paraboloid. It is recalled that the hexagonal tiling is optimal because of the fact that it is 13.4% less dense than a rectangular tiling for one and the same limited band function on a circular domain.

This hexagonal tiling poses a problem because of the fact that it does not optimize the collecting (or reflecting) area. Specifically, if it is considered that the minimum collecting area is inscribed within a circular domain which does not include the entirety of the areas of the hexagonal collecting tiles, then all the portions of the tiles which are situated outside of this circular domain are useless and increase the footprint and the mass of the mirror. For example, it is possible to show that in the case of a tiling (sampling) comprising 7 hexagons, about 44.7% of the collecting area is useless because of the fact that it is outside of the disk to be approximated. If it is now considered that the entirety of the collecting area (and therefore of the areas of the tiles) must be subtended by a circular domain, then an anisotropy of the MTF ("Modulation Transfer Function") is produced on account of the existence of unfilled domains on the periphery of the circle, and therefore of a deficit of collecting area.

To remedy this drawback it is possible for example to use smaller, and therefore a larger number of, hexagons. The approximation of the disk is indeed better and the lost collecting area smaller (about 22% of area lost in the presence of 37 hexagons). Alas, this solution considerably increases the difficulty of making the mirror. Specifically, since each hexagonal tile of the mirror has to be controlled actively by means of an actuator so as to counteract the instabilities in orbit, it is preferable to limit the number of actuators, notably to limit the rate of faults in orbit, the mechanical complexity of the support, deployment and orbit-control structure, the mass of the whole and the manufacturing cost.

SUMMARY OF THE INVENTION

Since no known solution is completely satisfactory, the aim of the invention is therefore to improve the situation.

It proposes for this purpose a deployable reflector, for a space observation instrument, comprising a chosen number of deployable reflecting elements which, once they are deployed in a first position, together define a reflecting area in the form of a so-called Reuleaux triangle with closed convex curve whose width is constant as a function of direction.

This solution makes it possible to carry out a compacting of the reflector by folding along characteristic axes tied to the geometry of its particular shape (Reuleaux triangle constituting an orbiform of minimum area). Additionally, this particular triangle inheriting properties of the circle while exhibiting a lesser area, it offers a different pupillary geometry from that of the disk but leading to an identical isotropy of the support of the MTF of the instrument as that afforded by a circular pupil.

It is possible to show that the folded-back reflector exhibits a circular footprint whose radius corresponds to 84.5% of the radius of an equivalent circular pupil (i.e. which would have the same optical cutoff function (or OCF)). Furthermore, the gain in lateral footprint of such a solution with respect to a circular-shaped reflector is about 15%. Additionally, this solution leads to a reduction in the collecting area (therefore in the mass) of the order of 10.3% with respect to the disk. The number of photons collected is consequently substantially reduced in the same ratio, but it can be offset by a larger exposure time or by the use of a restoration processing to produce an image of identical quality to that which would be obtained with a circular pupil.

The deployable reflector according to the invention can comprise other characteristics which can be taken separately or in combination, and notably:

it can comprise i) six deployable reflecting elements, which define in pairs three identical and complementary portions of the reflecting area, each pair comprising first and second complementary elements, and ii) a mechanism coupled to the elements and charged, on the one hand, with maintaining before deployment the first and second elements of each pair in a second position in which they are folded back towards one another, at least partially, with respect to one of the three right bisectors of the Reuleaux triangle, and on the other hand, with rotating the first and second elements of each pair about the corresponding right bisector so as to place them in said first position;

the mechanism can be charged with maintaining the first and second elements of each pair in a second position in which they are folded back towards one another with respect to one of the three right bisectors of the Reuleaux triangle so that their reflecting areas are substantially opposite one another;

each first element and each second element of each pair can comprise a first end part situated at the level of a central zone of the reflector and a second end part situated, once deployed, at the level of one of the three vertices of the Reuleaux triangle. In this case, the mechanism is charged with rotating the end parts of the first and second elements of each pair, over an angular portion chosen with respect to an axis substantially perpendicular to the corresponding right bisector so as to place them in a second position in which the axis passing through their first and second end parts makes a first chosen angle with a direction perpendicular to the three right bisectors and passing through the center of said central zone;

the first angle is for example chosen in an interval lying between 0° and 30°;

the mechanism can also be charged with rotating the end parts of the first and second elements of one at least of the pairs over a chosen angular portion about the axis so as to bring this pair closer to one at least of the other pairs.

The invention also proposes an observation instrument, for a spacecraft, comprising at least one deployable reflector as claimed in one of the preceding claims.

This observation instrument can for example comprise a support of axial type, firstly, substantially parallel to the direction perpendicular to the three right bisectors of the Reuleaux triangle, secondly, integral with the mechanism of the deployable reflector, and thirdly, furnished at a chosen level with three openings each suitable for housing portions of the first and second elements of a pair when they are placed in the second position.

The invention is particularly well adapted, although not exclusively, to observation instruments of telescope type (for optical applications) or antenna type (for microwave applications), intended to be installed in spacecraft, such as for example satellites.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWING

The present invention is illustrated by way of example, and not by limitation, in the figures of the accompanying drawings, wherein elements having the same reference numeral designations represent like elements throughout and wherein:

FIGS. 4A and 4B illustrate respectively, in a diagrammatic manner, a first exemplary folding-back of a reflector according to the invention, in a perspective view, and a second exemplary folding-back of a reflector according to the invention, in an end-on view, and FIGS. 5A and 5B illustrate in a diagrammatic manner a part of an observation instrument in the absence of its secondary reflector but with a primary reflector respectively folded back and deployed (or unfolded).

DETAILED DESCRIPTION OF THE DRAWING

The appended drawings will be able not only to serve to supplement the invention, but also contribute to its definition, if appropriate.

The object of the invention is to offer a reflector (primary) of large diameter, for a space observation instrument, whose lateral footprint is minimized during the firing phase and whose mechanical deployment (or unfolding) is achievable in orbit.

More precisely, the invention proposes a deployable reflector comprising a chosen number of deployable reflecting elements which, once they are deployed in a first position, together define a reflecting area in the form of a so-called Reuleaux triangle with closed convex curve whose width is constant as a function of direction.

In the case of an optical application, the reflector is for example a mirror.

Figure 1:
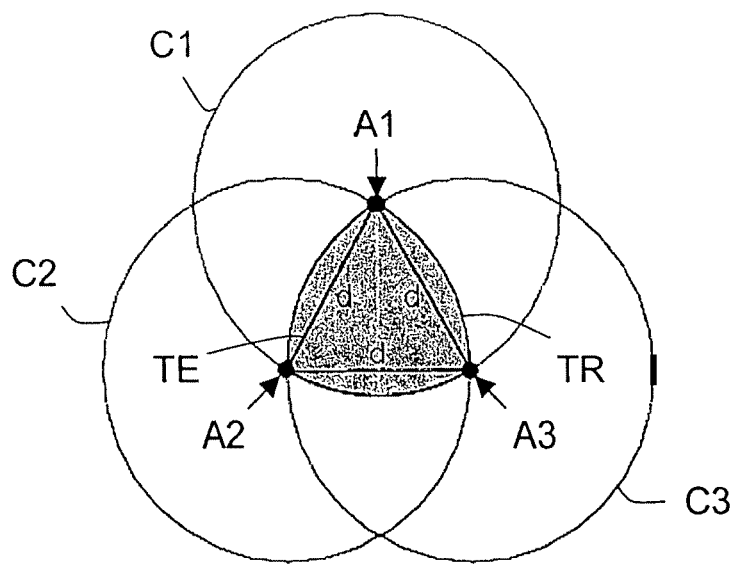
FIG. 1 illustrates in a diagrammatic manner how a Reuleaux triangle is constructed geometrically.

As is schematically illustrated in FIG. 1, to geometrically construct a Reuleaux triangle, first of all three circles Ci (i=1 to 3) are formed, placed with respect to one another in such a way that the circumference of each of them (Ci) passes through the center Ai' (i'≠i) of the other two (Ci'). By linking the centers Ai of the three circles Ci by means of straight lines, an equilateral triangle TE of side d is defined. The Reuleaux triangle TR, of side d, is for its part defined by the three arcs of the three circles Ci which link the centers Ai of the circles Ci pairwise.

As indicated above, the Reuleaux triangle is a closed convex curve belonging to the family of constant-width curves (or orbiforms) one of whose representatives is the circle. These orbiforms are closed curves which, when they are revolving in a square domain are simultaneously in contact with the four sides of this square. The width of a closed convex curve is defined as the distance between two parallel straight lines which delimit it. A consequence is that the auto-correlation support of the Reuleaux triangle of side d is geometrically identical to the auto-correlation support of the circle of diameter d.

By using a telescope or an antenna (or more generally an observation instrument) comprising a reflector defining, once unfolded, a Reuleaux triangle-shaped (collecting) entrance pupil, it is possible not only to effectively compact said reflector following certain axes (its right bisectors Mi) so as to minimize its lateral footprint in the firing phase, but also to endow it with isotropy properties of the circle. It is recalled here that the MTF of an optical instrument is obtained by performing the auto-correlation of its entrance pupil. If the latter is circular then so also is the support of its MTF. The isotropy is then ensured and the instrument collects energy (photons) identically in all angular directions. This characteristic is fundamental within the framework of wide-field observation, and notably within the framework of Earth observation.

The use of a Reuleaux triangle-shaped unfolded reflector makes it possible furthermore to minimize its collecting area and therefore its mass in comparison to a circular-shaped reflector exhibiting the same Optical Cutoff Frequency (or OCF). Admittedly, this reduction in the collecting area must be offset by an increase in the exposure time (photon integration time). It is indeed recalled that the signal-to-noise ratio is dependent on the product between the exposure time and the collecting area, so that exposure for a proportionately longer time is necessary in order to obtain one and the same image with less collecting area. This increase in the exposure time is less critical within the framework of space observation from a high orbit (for example geostationary) since the landscape imaged by the observation instrument remains relatively (or indeed enduringly) fixed. It is also possible to use a restoration processing (of deconvolution or post-accumulation type) to offset the reduction in the number of photons collected.

Figure 2:
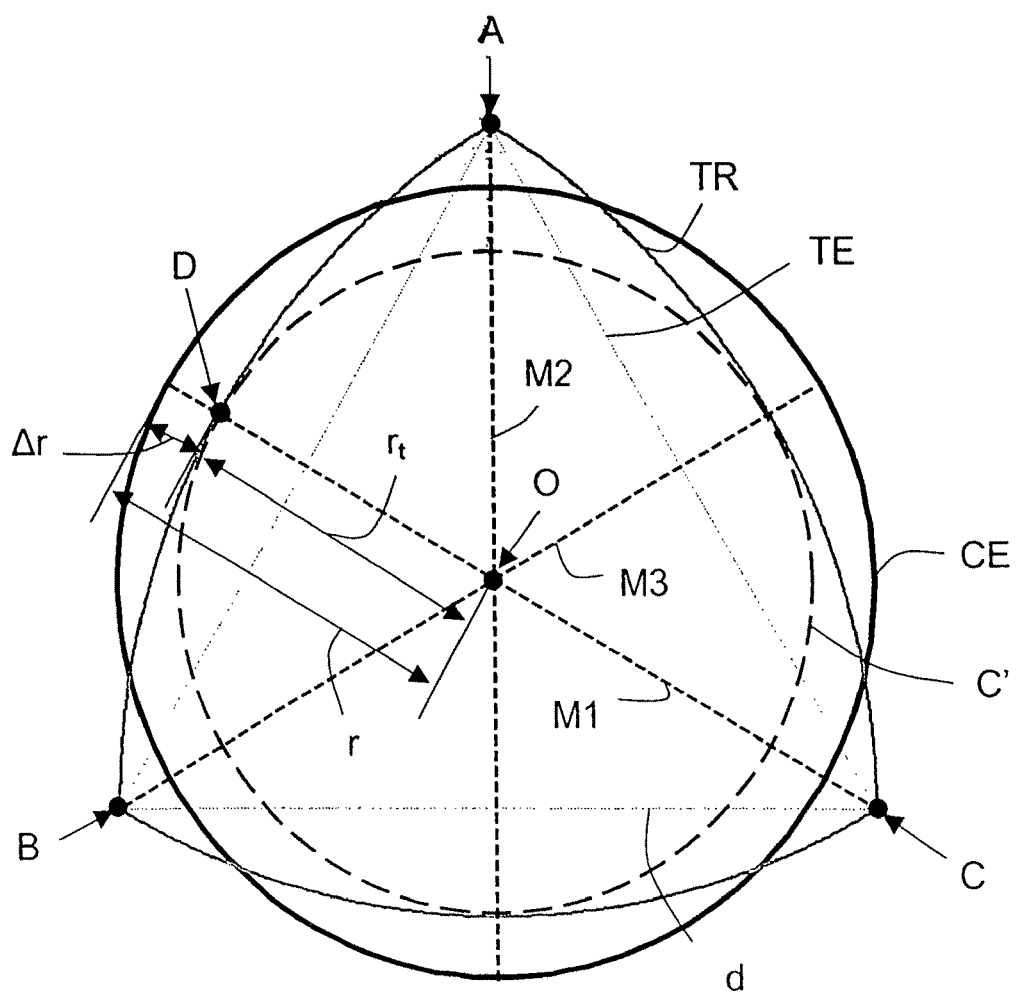
FIG. 2 illustrates in a diagrammatic manner a Reuleaux triangle-shaped pupil having the same optical cutoff frequency (OCF) as a circular-shaped pupil.

As is illustrated in FIG. 2, when the three vertices A, B and C of the Reuleaux triangle TR are respectively situated on the three vertices of an equilateral triangle TE of side d, then the reflector, which once unfolded (or deployed) exhibits this Reuleaux triangle shape TR of side d, leads exactly to the same OCF as that exhibited by a circular-shaped pupil CE of diameter d.

The support of the Optical Transfer Function (OTF) of an observation instrument whose entrance pupil is a Reuleaux triangle-shaped reflector TR of side d is therefore identical to that obtained with a circular-shaped reflector CE of diameter d. However, this entrance pupil TR exhibits an area of smaller dimension than that exhibited by the circular entrance pupil CE. Specifically, if d denotes the length of the side of the equilateral triangle TE inscribed within the associated Reuleaux triangle TR, the area $A_R$ of the latter equals:

$$A_R = \frac{d^2}{2}(\pi - \sqrt{3}).$$

The area $A_C$ of the circumscribed circle CE equals:

$$A_c = \pi \frac{d^2}{4}.$$

From this it follows that the area of the Reuleaux triangle TR represents about 89.7% of that of the circumscribed circle CE. Consequently, if it is assumed that the mass of the reflector is directly proportional to its area, then the mass of a Reuleaux triangle-shaped reflector TR is about 10.3% less than that of a reflector with pure circular geometry CE.

Additionally, if the radius of the circle C' inscribed inside the Reuleaux triangle TR is called $r_t$, then $r_t$ is related to the radius r (r=d/2) of the circumscribed circle CE by the following relation:

$$r_t = 2r(1-\sqrt{3}) \approx 0.845r$$

from which it follows that:

$$\Delta_r = r - r_t = r\frac{2-\sqrt{3}}{\sqrt{3}} \approx 0.155r.$$

The maximum deviation between the inscribed circle C' and the Reuleaux triangle TR, with the same OCF, corresponds to about 15.5% of the radius of the circumscribed circle CE. Stated otherwise, the smallest distance OD, between the center O of the Reuleaux triangle TR and its edge, is equal to the radius $r_t$ which is itself equal to 84.5% of the value of the radius r of the circumscribed circle CE with the same OCF.

Figure 3A:
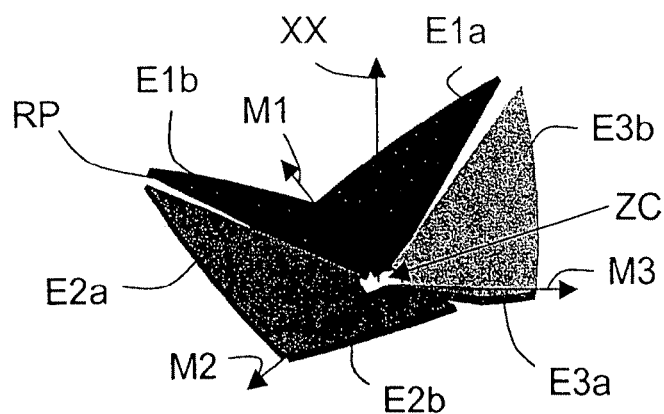
FIGS. 3A to 3D illustrate in a diagrammatic manner a chaining of steps making it possible to fold back a reflector according to the invention.
Figure 3B:
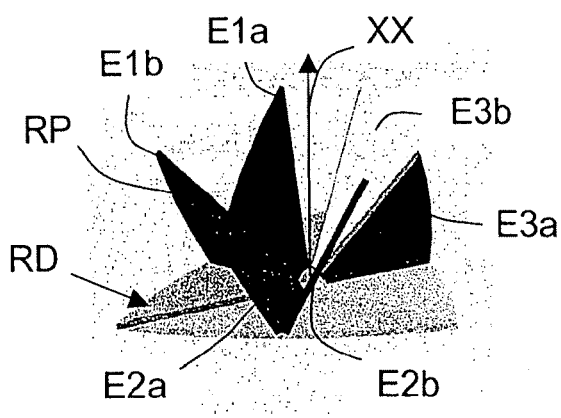

Consequently, if one wants to compact in an optimal manner (that is to say obtain a minimum footprint) a Reuleaux triangle-shaped reflector TR, it is necessary first of all to "cut" it along the segments OA, OB and OC so as to constitute three complementary and substantially identical portions Ei (i=1 to 3), then, as illustrated in FIGS. 3A and 3B, fold each part Ei into two, substantially complementary, sub-parts (or elements) Eij (j=a or b), along the corresponding right bisector Mi of the Reuleaux triangle TR. As is illustrated in FIG. 2, each right bisector Mi actually passes through a point (D in the case of M1) which is situated on the edge of the Reuleaux triangle TR at the location where it is the least distant from its center O. The reflector thus segmented into pairs Ei of deployable elements Eij ensures a maximum footprint delimited by the inscribed circle C' of radius $r_t$.

Figure 3C:
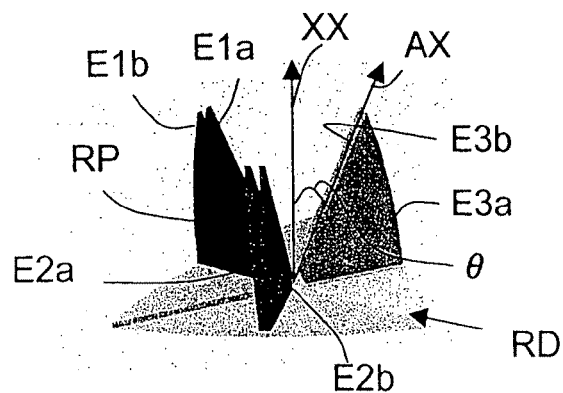

It is important to note that the two elements (sub-parts) Eij (Eia and Eib) of a pair or portion Ei can be folded back partially towards one another as is illustrated in FIG. 3B, or else folded back fully towards one another so that their reflecting surfaces are opposite one another and approximately parallel to one another as illustrated in FIG. 3C. In FIGS. 3A to 3D, the reference RP designates the reflector when it is not in the deployed (or unfolded) position, while the reference RD designates the reflector when it is in the deployed position (or first position).

When the deployable elements Eij of a pair Ei have been folded back partially or fully towards one another, the axis AX, which is parallel to each edge of an element Eij, passing through the vertex of the latter and through a first end part situated in a central zone ZC, makes an angle θ with respect to the axis XX which is perpendicular to the right bisectors Mi of the Reuleaux triangle TR (deployed) at the level of its center O (situated in the central zone ZC). The vertex of a deployable element Eij is a second end part which partially defines one of the three vertices A, B and C of the Reuleaux triangle TR when it is fully deployed (first position).

The maximum footprint of the reflector RP (in the firing phase), notably illustrated in FIG. 3C, can be reduced. Accordingly, it is possible to drive over a chosen angular portion the vertex of each of the deployable elements Eij (folded back partially or fully) towards the axis XX so as to reduce the value of the angle θ. The lateral footprint of the reflector RP is then certainly delimited by a circle of radius less than $r_t$. For example, the final angle θ can lie between about 0° and about 30°. The smaller this final angle θ, the smaller the lateral footprint of the reflector RP (in the firing phase).

Figure 3D:
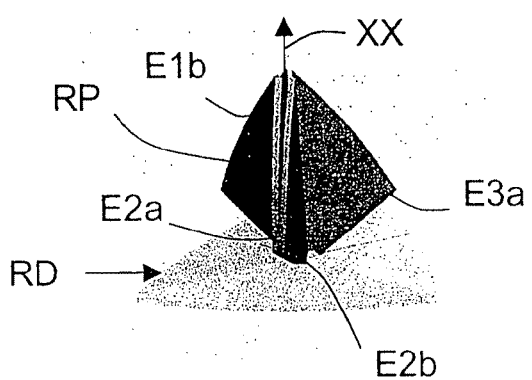

In the example illustrated in FIGS. 3D and 4A, the final angle θ is substantially equal to zero (0). This corresponds to a final position (or second position) which is favourable to the maintenance of the deployable elements Eij of the reflector MR during the firing phase.

The maximum footprint of the reflector RP (in the firing phase) can be reduced still more. Accordingly, it is possible, as illustrated in FIG. 4B, to rotate about the axis XX, over a chosen angular portion, one at least of the pairs Ei of deployable elements Eij, so as to bring it closer to one at least of the other pairs Ei'. In the example illustrated in FIG. 4B, the pairs E1 (E1a and E1b) and E3 (E3a and E3b) have been brought closer to the pair E2 (E2a and E2b). The lateral footprint of the reflector RP when it is in its second position (during the firing phase) can thus be reduced greatly with respect to the lateral footprint of this same reflector RP when it is in its second position RD (once deployed).

All these folding-back operations are performed by means of a mechanism MC which is coupled to the pairs of deployable elements Eij of the reflector RP and forms part of the observation instrument IO.

For example, as illustrated in FIGS. 5A and 5B, the observation instrument IO can comprise a support MA, such as for example a mast (possibly hollow), which extends substantially along the axis XX, and comprises, firstly, a mount EM in which the mechanism MC of the deployable (primary) reflector RP is for example installed, secondly, three primary openings (or apertures) OP communicating with the mount EM and each intended to house a portion of the first Eia and second Eib deployable elements of a pair Ei, when it is placed in the second position, and thirdly, an end part supporting a secondary reflector RS.

An exemplary folded-back position (or second position) of the reflector RP during the firing phase is illustrated in FIG. 5A, while the unfolded or deployed position (or first position) of the reflector RP during the observation phase is illustrated in FIG. 5B.

The deployment (or unfolding) of the reflector RP from its second position to its first position is done by performing the operations mentioned above in the case of folding-back, but in reverse, by means of the mechanism MC. Consequently, once the spacecraft has been placed in orbit, the mechanism MC begins optionally by rotating with respect to the axis XX each pair Ei initially brought closer to another pair Ei', so that they are substantially 120° to one another. Then, the mechanism MC moves the vertices of the pairs Ei of elements Eij away from the axis XX until the angle between the axes XX and AX is equal to θ. Finally, the mechanism MC rotates the deployable elements Eij of each corresponding pair Ei about each right bisector Mi until the reflector RP exhibits a Reuleaux triangle shape corresponding to its first position.

The invention offers several advantages, among which:
an appreciable gain in mass and footprint for imaging capability (to within the integration time) almost identical to that of a circular reflector on account of an angularly invariant cutoff frequency,
a reduction in the number of elements to be controlled, and therefore the mechanisms for positioning elements, so as to constitute in orbit a reflector suited to the mission, as compared with a reflector made by means of hexagonal elements,
a minimum and entirely useful collecting area,
a reduction in the deployment mechanisms, due to the low number of elements to be deployed.

The invention is not limited to the deployable reflector and space observation instrument embodiments described above, solely by way of example, but it encompasses all the variants that may be envisaged by the person skilled in the art within the framework of the claims hereinafter.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

The invention claimed is:

1. A deployable reflector (RP) for a space observation instrument (IO), comprising:
a chosen number of deployable reflecting elements suitable, once deployed in a first position, for together defining a reflecting area in the form of a Reuleaux triangle with closed convex curve whose width is constant as a function of direction.

2. The deployable reflector as claimed in claim 1, comprising i) six deployable reflecting elements defining in pairs three identical and complementary portions of said reflecting area, each pair comprising first and second complementary elements, and ii) a mechanism coupled to said elements and designed, to maintain before deployment the first and second elements of each pair in a second position in which the elements are folded back towards one another, at least partially, with respect to one of the three right bisectors of said Reuleaux triangle, and to rotate said first and second elements of each pair about the corresponding right bisector so as to place them in said first position.

3. The deployable reflector as claimed in claim 2, wherein said mechanism is designed to maintain the first and second elements of each pair in a second position in which they are folded back towards one another with respect to one of the three right bisectors of said Reuleaux triangle so that their reflecting areas are substantially opposite one another.

4. The deployable reflector as claimed in claim 3, wherein each first element and each second element of each pair comprises a first end part situated at the level of a central zone of said reflector and a second end part situated, once deployed, at the level of one of the three vertices of said Reuleaux triangle, and in that said mechanism is designed to rotate said end parts of the first and second elements of each pair over an angular portion chosen with respect to an axis substantially perpendicular to the corresponding right bisector so as to place them in a second position in which an axis passing through their first and second end parts makes a first chosen angle with a direction perpendicular to the three right bisectors and passing through a center of said central zone.

5. The deployable reflector as claimed in claim 2, wherein each first element and each second element of each pair comprises a first end part situated at the level of a central zone of said reflector and a second end part situated, once deployed, at the level of one of the three vertices of said Reuleaux triangle, and in that said mechanism is designed to rotate said end parts of the first and second elements of each pair over an angular portion chosen with respect to an axis substantially perpendicular to the corresponding right bisector so as to place them in a second position in which an axis passing through their first and second end parts makes a first chosen angle with a direction perpendicular to the three right bisectors and passing through a center of said central zone.

6. The deployable reflector as claimed in claim 5, wherein said first angle is chosen in an interval lying between 0° and 30°.

7. The deployable reflector as claimed in claim 6, wherein said mechanism is designed to rotate said end parts of the first and second elements of one at least of said pairs, over a chosen angular portion about said axis so as to bring this pair closer to one at least of the other pairs.

8. The deployable reflector as claimed in claim 5, wherein said mechanism is designed to rotate said end parts of the first and second elements of one at least of said pairs, over a chosen angular portion about said axis so as to bring this pair closer to one at least of the other pairs.

9. A space observation instrument for a spacecraft, comprising at least one deployable reflector as claimed in claim 1.

10. The space observation instrument as claimed in claim 9, comprising a support of axial type i) substantially parallel to the direction perpendicular to the three right bisectors of said Reuleaux triangle, ii) integral with the mechanism of said deployable reflector, and iii) furnished at a chosen level with three openings each suitable for housing portions of the first and second elements of a pair when they are placed in said second position.

* * * * *